United States Patent
Patten, Jr.

[11] 3,847,267
[45] Nov. 12, 1974

[54] PICKUP MECHANISM
[76] Inventor: Dan H. Patten, Jr., 4020 E. Washington St., Phoenix, Ariz. 85034
[22] Filed: Apr. 5, 1973
[21] Appl. No.: 348,038

Related U.S. Application Data
[62] Division of Ser. No. 245,794, April 20, 1972.

[52] U.S. Cl. ............................ 198/20 R, 198/33 AB
[51] Int. Cl. ............................................. B65g 47/00
[58] Field of Search ....... 198/20, 25, 160, 167, 168, 198/209, 211, 154, 33 AA, 33 R, 33 AB

[56] References Cited
UNITED STATES PATENTS
1,721,551   7/1929   Ferenci .......................... 198/20 R
1,786,608  12/1930   Littlefield ........................ 98/168
1,843,453   2/1932   Littlefield ........................ 198/168
2,705,069   3/1955   Patten ......................... 198/33 AA Primary Examiner—Evon C. Blunk
Assistant Examiner—Joseph E. Valenza

[57] ABSTRACT

A pickup mechanism for use with roof tile fabricating machines and the like. The pickup mechanism separates pallets carried on a parallel chain conveyor and individually lifts them off of the conveyor and places them on another such conveyor.

1 Claim, 5 Drawing Figures

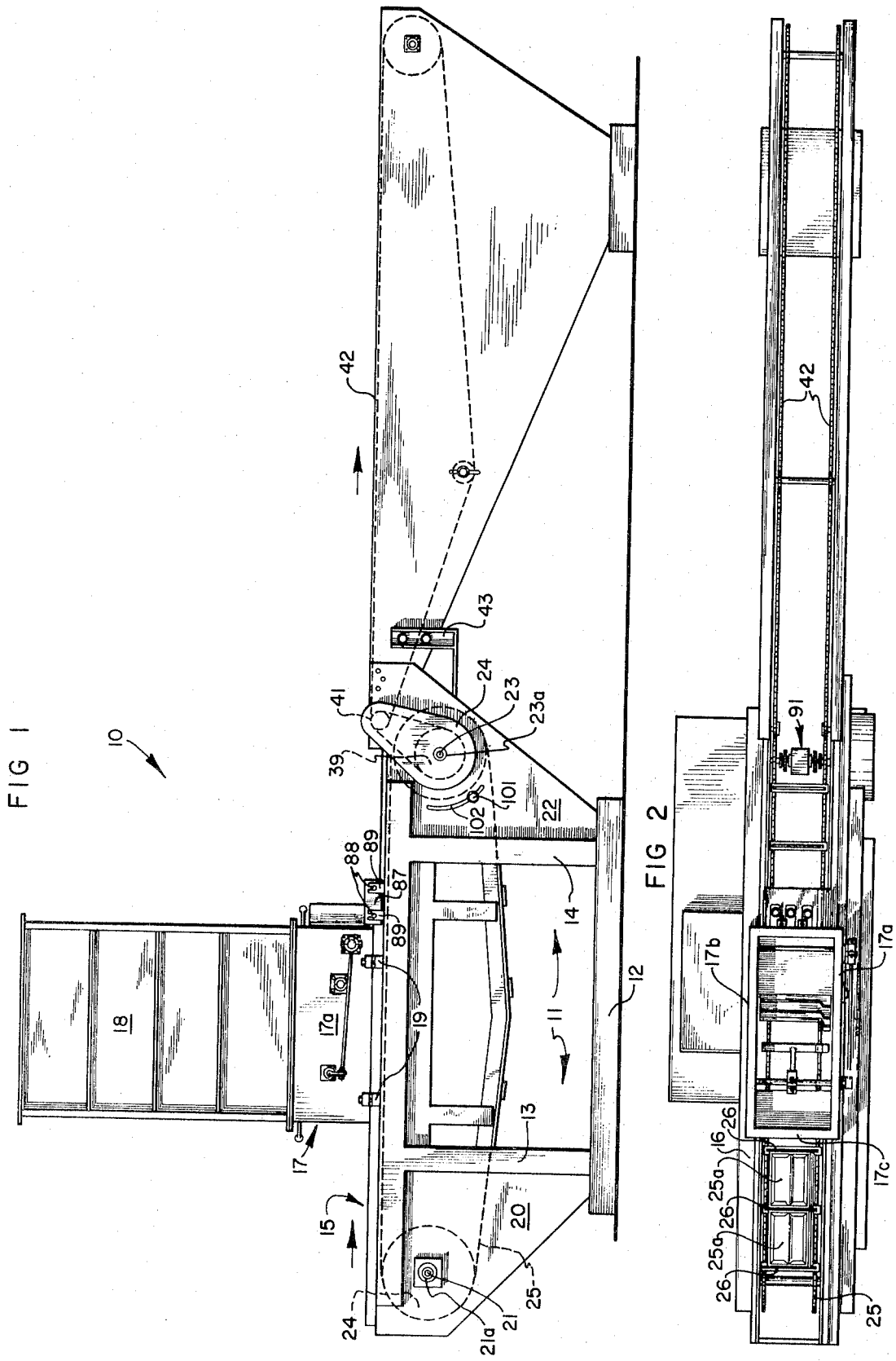

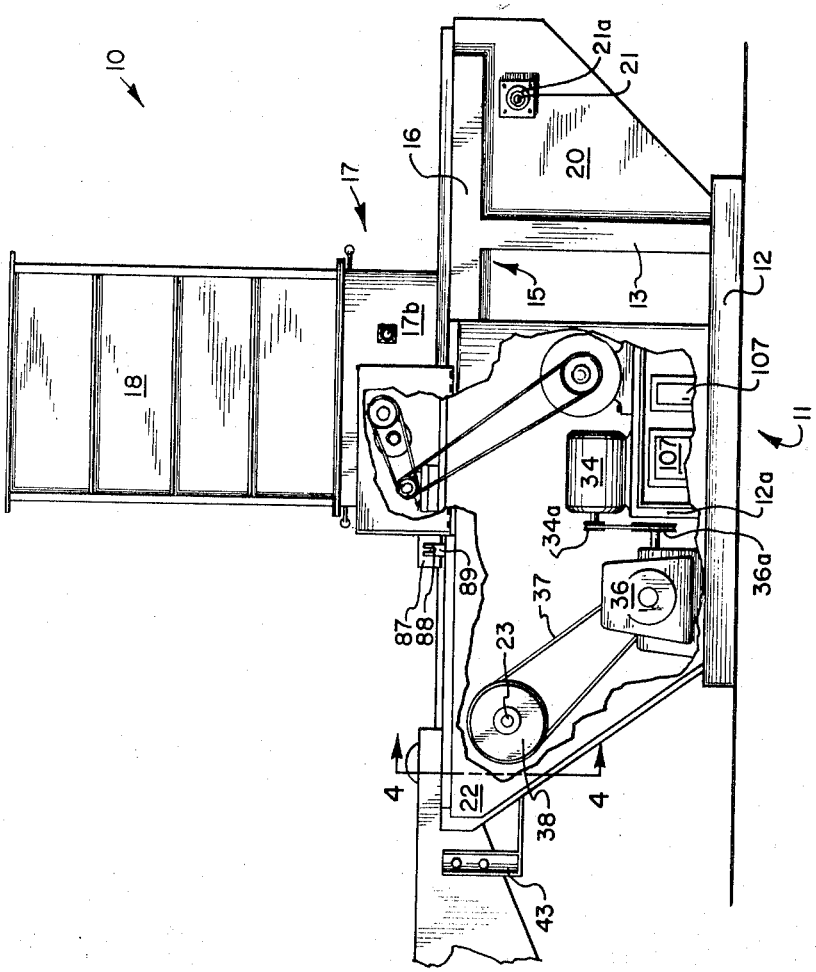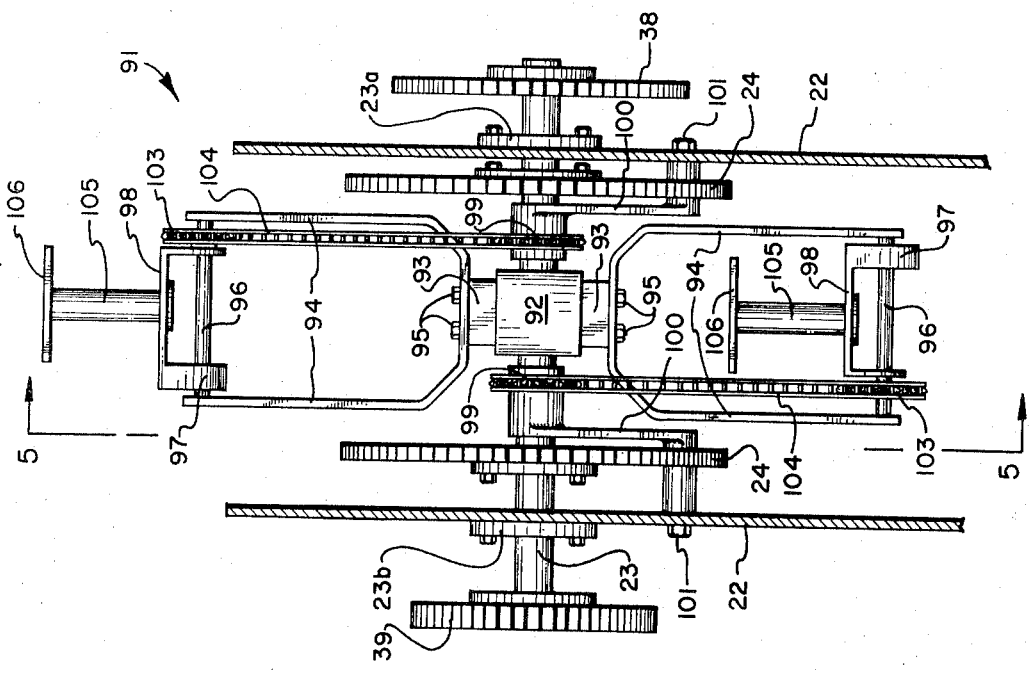

PICKUP MECHANISM

BRIEF DESCRIPTION OF THE INVENTION

This application is a division of application Ser. No. 245,794, filed Apr. 20, 1972.

FIELD OF THE INVENTION

This invention relates to a mechanical apparatus arranged to lift and separate pallets as one of the steps in the fabricating of roof tiles or the like.

PRIOR ART

Machines for automatically fabricating roof tiles on pallet forms conveyed therethrough have long been known and are in common use. Such machines are, of course, combinations of individual component apparatus with each component performing a specific function in the tile making process. U.S. Pat. No. 2,705,069, teaches a pickup mechanism as a component apparatus and outlines its use in combination with other component apparatus of a tile making machine to produce a commercially acceptable roof tile. The article handling apparatus of the aforementioned patent has been found to adequately perform the step of individually separating and redirecting the individual pallets, with tiles formed thereon, from one conveyor system to another, upon their emergence from the forming portion of a continuous tile making machine. However, this known handling apparatus does not provide for adjustment of the location and angle at which the apparatus contacts and lifts the tile pallet. Also, the known machine is expensive to construct and maintain and it has been found possible to produce a machine that will fabricate a more uniformly satisfactory finished tile at less cost and with fewer and more efficient machine operations.

SUMMARY OF THE INVENTION

It is a principal object of the present invention to provide a pickup mechanism useful in the fabricating of roof tiles of uniformly high quality from a cement mixture or from like materials.

Another object is to provide an apparatus which is adjustable to produce a clean separation of individual palletized finished tiles and for moving them onto another in-line conveyor as they emerge from the tile fabrication machine.

Still another object is to provide a pickup mechanism for a roof tile fabricating machine that is easily and inexpensively constructed and that is easily disassembled to allow its various parts to be readily cleaned and adjusted.

Separation and removal of each tile carrying pallet from a column of pallets issuing from a fabrication machine is accomplished by the pickup mechanism of the invention. The pickup mechanism is adjustable to contact, in turn, each pallet form at a point on its undersurface such that the pallets rear edge that is in contact with a following pallet is elevated first. A clean separation of the ends of each tile is thereby accomplished. The pickup mechanism is arranged to place each pallet onto a second conveyor which routes the roof tile and pallet form to an area where curing of the tile and separation of the tile from the pallet form is accomplished.

Additional objects and features of the invention will become apparent from the following detailed description and drawings disclosing what is presently contemplated as being the best mode of the invention.

THE DRAWINGS

FIG. 1 is a side elevation view of a tile fabrication machine including a pickup mechanism of the present invention arranged to be used in the fabricating of roof tiles;

FIG. 2, is a top plan view of the fabrication machine looking down into the machine through the hopper;

Figure 5:
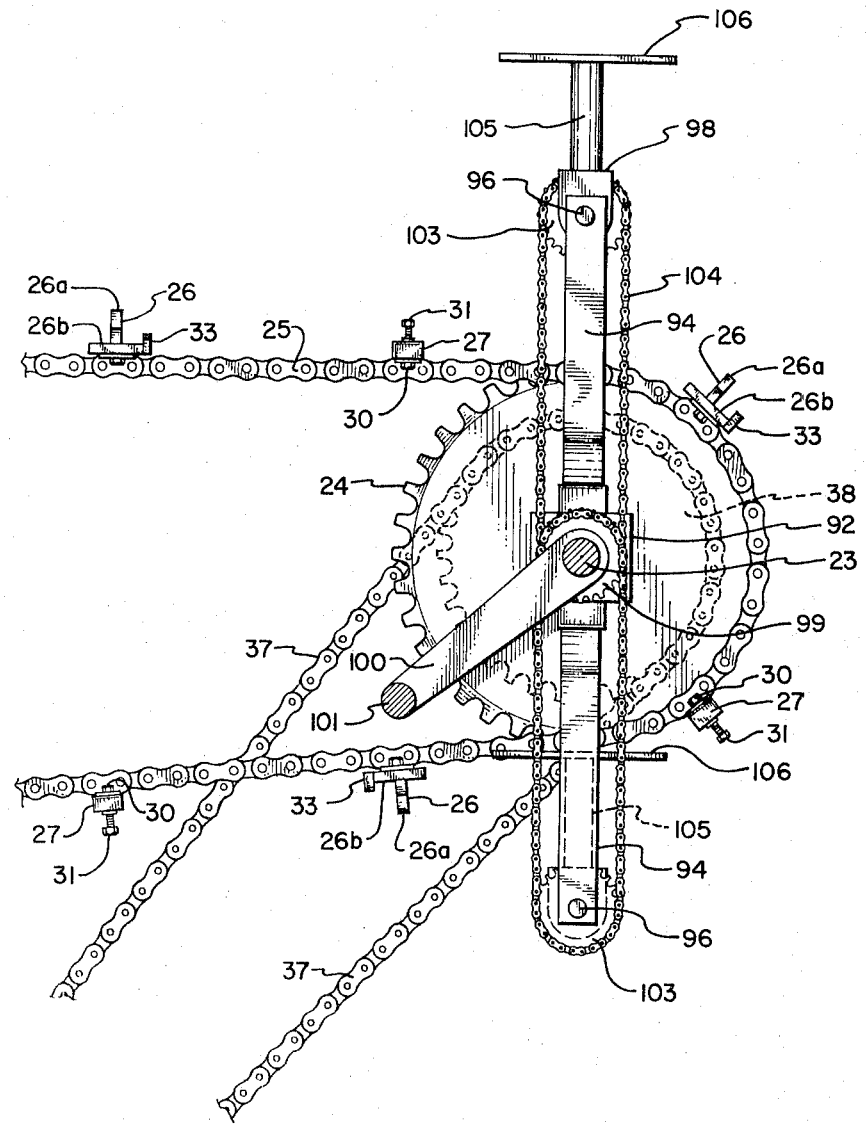

FIG. 3, an expanded back view of the fabrication machine of FIG. 1, with the machine side housing broken away to expose the machines power transfer arrangement;

FIG. 4, an enlarged sectional view taken on the line 4—4 of FIG. 3; and

FIG. 5, a vertical section, taken on the line 5—5 of FIG. 4, and showing a portion of the tile conveyor.

DETAILED DESCRIPTION

Referring now to the drawings:

In the illustrated preferred embodiment of the invention a roof tile fabricating machine, shown generally at 10, and hereinafter referred to as the machine, is supported by a frame 11. Frame 11 is composed of a base 12 and vertical legs 13 and 14 that are connected at their tops to a horizontally disposed frame 15, formed from spaced apart parallel beams 16.

Beams 16, FIGS. 1 and 3, support a housing 17 having a hopper 18 thereon. The bottom of hopper 18 is recessed and secured by welding or otherwise, to housing 17. Bolts 19, FIG. 1, are arranged to secure housing 17 to beams 16.

A pair of spaced, parallel, vertically disposed plates 20 are secured to the legs 13 and rotatably support an axle 21 journaled through bearings 21a and 21b fitted therein. A similar pair of plates 22 are secured to legs 14, and rotatably support an axle 23 journaled through bearings 23a and 23b fitted therein, FIG. 4. Pairs of vertically disposed sprockets 24 are mounted on each of the axles 21 and 23, and a pair of endless chains 25 are trained thereover. The chains 25 constitute an endless conveyor for moving pallet forms 25a, FIG. 2, thereon. The pallet forms are adapted to be placed on the conveyor by an operator or by a machine positioned adjacent to plates 20, and the pallet forms each serve as a moving floor of the machine 10, on which roof tiles are formed.

Upstanding separators 26, FIGS. 2 and 5, extend between the pair of chains 25 and are welded or otherwise secured thereto, to separate pallets conveyed on the chains. The ends of a lower web 26b of each separator 26 are connected to chains 25 such that an upper edge 26a of the upstanding separator partition is proximate to the top surface of a finished roof tile as it emerges from machine 10.

Pier blocks 27 are arranged on the chains 25, between the separators 26. The pier blocks 27, one of which is shown exploded away from its chain 25 in FIG. 5, are secured to brackets 28 and 29, FIG. 5, having lower sides 28a and 29a forming links of chains 25. Bracket 28 is straight and has a hole 28b formed in its upper portion to accommodate a bolt 30 inserted therethrough and threaded into an appropriate hole 27a formed in an end of pier block 27. Bracket 29 is formed with a right angle bend therein such that another bolt 30 inserted through a hole 29b formed therein can be turned into a threaded hole 27b in the bottom of pier block 27. Bolts 30 fix the pier block through brackets 28 and 29, to chains 25. A pier bolt 31 is threaded into a hole formed in the pier block top 27c, and is locked in a set position by turning a lock nut 32 on the bolt 31 against the pier block top 27c. The pier bolt thus provides a rigid pier support for a pallet positioned thereon.

Pallet forms 25a are further supported at their ends by the top edge of upright bars 33 that are fixed to the edges of the separator web 26b. Bars 33 support the ends of the pallet forms as the forms pass through the forming and compressing portions of machine 10, in a manner to be more fully set forth herein. Should finished roof tiles having nail holes formed therein be desired, appropriate upstanding posts, not shown, can be included on the separator webs 26b to project upwardly through holes in the individual pallet forms so that the tiles would be formed around the posts.

A motor 34, FIG. 3, connected to a suitable source of electricity, is supported on a frame 12a which projects upwardly from the base 12. Motor 34 turns a transmission 36 through a pulley 34a that is fixed to the end of the motor drive shaft, a belt 35 and a transmission pulley 36a on the input shaft of the transmission. The output shaft of transmission 36 drives a chain 37 and a sprocket 38, FIGS. 3 and 4, which sprocket is secured to one end of axle 23. As sprocket 38 turns, axle 23 rotates sprockets 24 attached thereto, thereby driving chains 25, and operating a pickup mechanism to be hereinafter described in detail. Rotation of axle 23 also turns a sprocket 39 secured to the opposite end of axle 23. A chain 40 interconnects sprocket 39 and a sprocket 41, shown in dotted lines in FIG. 1, to drive a loaded pallet form chain conveyor 42.

The loaded pallet form chain conveyor 42 transports the pallet forms, with roof tiles formed thereon, to a location where they are unloaded for drying and storage. The loaded pallet chain conveyor 42 is attached and aligned by brackets 43 fixed to beams 16 such that pallet forms received on the pickup mechanism to be described will be deposited on the chain conveyor 42 after they are individually lifted from chains 25.

Pallets emerging from a trowel are transported by conveyor chains 25 to the pickup mechanism 91. The hub 92, FIG. 4, of the pickup mechanism 91 is secured to axle 23 and is positioned mid-way between the vertically disposed plates 22. Hub 92, like sprockets 24, 38, and 39, is secured so as to turn with axle 23. A pair of spacer blocks 93 are mounted on opposite sides of the hub 92 and each has the inner transverse web of a U-shaped bracket 94 connected thereto by bolts 95. Each bracket 94 has a stub shaft 96 mounted on and fixed between the outer ends of their side arms, and each stub shaft is journaled through a bearing member 97. A shelf plate 98 is secured to each bearing 97. A pair of spaced apart sprockets 99 that are fixed on the axle 23 are each linked by an arm 100, that extend from one end thereof, to the vertically disposed plates 22. A bolt 101 is inserted through an arcuate elongated opening 102, FIGS. 1 and 4, formed in each plate 22 and is threaded into an appropriate hole formed in the associated arm 100. When bolt 101 is loosened the associated arm can be arcuately pivoted in conformance with the associated opening 102. Then, if the bolt 101 is tightened, the position of the arm 100 is fixed with relation to its associated plate 22.

Each stub shaft 96 has a sprocket 103 secured thereto that is fixed to shelf plate 98 to cause it, with its bearing 97, to rotate about the fixed stub shaft 96 in response to the rotation of brackets 94. Chains 104 are trained over the respective pair of sprockets 99 and 103, whereby rotation of the axle 23, through hub 92 and brackets 94, causes rotation of plates 98 and their bearings 97 about the axis of stub shafts 96. A post 105 that projects from and is fixed to each of the shelf plates 98 has a platform 106 secured in a normal plane to the other post end.

As the pickup mechanism 91 turns, each platform 106 in turn will engage alternate pallets, whereby each pallet will be removed from conveyor chains 25 and deposited on chain conveyor 42. Sprockets 99 and 103 are linked by chains 104 that are trained thereover, to maintain the posts 105 in a vertical attitude as they are revolved about the axis of shafts 96. Each platform 106, in turn, moves under, engages and lifts a pallet to transfer it from the conveyor chains 25 onto the receiving chain conveyor 42. Partial rotation of the arms 100 that are connected to sprockets 99, by loosening bolt 101 and moving each arm 100 along the elongate opening 102 adjacent thereto, adjusts the angular displacement of the post 105 as it is moved into engagement with the undersurface of a loaded pallet form. When arms 100 are moved with respect to plates 22 sprockets 99 are rotated, thereby changing the angle at which the platform 106 contacts the undersurface of a loaded pallet form. Markings, not shown, may be scribed on plates 22, alongside elongated opening 102, to provide reference points for adjusting the angular displacement of posts 105. By providing a means for adjusting the contact point of each platform 106 with each pallet form undersurface, each pallet form can be broken away from its following pallet form at a desired pick-up angle, i.e. with the rear edge of each pallet form being raised slightly before the remainder of the pallet form is picked up by the platform 106. Thus, the roof tile edges formed between loading and following tiles are neatly sheared apart, rather than being compressed together as sometimes occurs if the pallet form is first lifted at its front or leading edge or even if the entire pallet form is simultaneously raised.

The troweled pallet forms are moved by chains 25 to the pickup mechanism 91 of the invention, which moves the finish pallet forms onto the chain conveyor 42 for movement to a location where they are unloaded for drying and storage.

Although a preferred form of my invention has been herein disclosed, it is to be understood that the present disclosure is made by way of example and that variations are possible without departing from the scope of the hereinafter claimed subject matter, which subject matter I regard as my invention.

I claim:

1. A pickup mechanism for use in roof tile fabricating machines and the like comprising spaced continuous conveyor means across which items are positioned to be transported;

support means at opposite sides of the conveyor means;

a horizontally disposed axle journaled through said support means;

means for turning said axle;

a hub centrally secured on said axle;
a pair of oppositely extending U-shaped brackets having their webs connected to said hub;
a stub shaft carried by the ends of each said bracket;
a support rotatably mounted on each said stub shaft;
a sprocket means connected to each said support;
a pair of sprockets journaled on said axle;
a chain trained over each sprocket means on a bearing support and one of said sprockets journaled on the axle; and
adjustable means for rotating said sprockets journaled on the axle and for fixing their rotational positions with respect to the support means, said adjustable means comprising
an arm fixed to each sprocket journaled on the axle and extending to the adjacent support means,
arcuate opening means in each said support means, and
bolt means extending through said arcuate opening means and threaded into the arm extending thereto to fix the arm to the support means.

* * * * *